United States Patent [19]

Masak

[11] Patent Number: 4,771,289

[45] Date of Patent: Sep. 13, 1988

[54] BEAMFORMING/NULL-STEERING ADAPTIVE ARRAY

[75] Inventor: Raymond J. Masak, East Northport, N.Y.

[73] Assignee: Hazeltine Corporation, Greenlawn, N.Y.

[21] Appl. No.: 17,109

[22] Filed: Feb. 20, 1987

Related U.S. Application Data

[63] Continuation-in-part of Ser. No. 383,036, May 28, 1982, Pat. No. 4,651,155.

[51] Int. Cl.[4] .............. G01S 3/42

[52] U.S. Cl. .............. 342/383; 342/378

[58] Field of Search .............. 342/368, 378-384

[56] References Cited

U.S. PATENT DOCUMENTS 3,763,490 10/1973 Hadley et al. .............. 342/379 X
4,017,867 4/1977 Claus .............. 342/368
4,156,877 5/1979 Piesinger .............. 342/368
4,173,759 11/1979 Bakhru .............. 342/382
4,217,586 8/1980 McGuffin .............. 342/380
4,357,610 11/1982 Kingston et al. .............. 342/383 X
4,528,674 7/1985 Sweeney et al. .............. 342/383 X

*Primary Examiner*—Theodore M. Blum
*Assistant Examiner*—Gilberto Barrón, Jr.
*Attorney, Agent, or Firm*—E. A. Onders

[57] ABSTRACT

A beamforming adaptive control loop is simultaneously employed in combination with a null-steering adaptive control loop to enhance the signal/interference ratio resulting in an increase in the messasge quality. The loops may employ temporal processing in which case on-epoch sample/hold filters and off-epoch sample/-hold filters form separate loops which enhance the desired signal and cancel the undesired signal, respectively. The correlated output from the beamforming loop is added to the correlated output of the null-steering loop and mixed with the incoming signal.

2 Claims, 4 Drawing Sheets

NULL-STEERING ONLY

NULL-STEERING AND BEAMFORMING

BEAMFORMING/NULL-STEERING ADAPTIVE ARRAY

This application is a continuation-in-part of Ser. No. 06/383,036 filed May 28, 1982, now U.S. Pat. No. 4,651,155.

BACKGROUND OF THE INVENTION

1. Field of the Invention

The invention generally relates to an apparatus for adaptive signal processing and, in particular, an adaptive processor including beamforming and null-steering for an array antenna.

2. Description of the Prior Art

Phase-coded spread spectrum communication signals may be acquired and synchronized in the presence of interference with the aid of an adaptive array antenna under the control of a well-known LMS (least mean square) algorithm performing power minimization. However, the signal to interference (S/I) ratio at the adaptive array output port of a system using this type of processing, although adequate for acquisition and synchronization, provides undesirable message quality which, at best, is several decibels below the theoretical maximum obtainable when direction of arrival (beam steering) information is available.

In narrow band interference (e.g., AM radios) communication systems, the spectral bandwidth of the interference source is significantly wider than the desired signal's bandwidth. Null-steering in such a case may be obtained by an LMS algorithm with spectral preconditioning of control signals of an adaptive processor to prevent null formation on the desired signal.

SUMMARY OF THE INVENTION

It is an object of this invention to provide an adaptive processor which performs simultaneously beamforming and null-steering.

It is another object of this invention to provide adaptive processing with a first adaptive control loop having off-epoch sample/hold filters and a second adaptive control loop having on-epoch sample/hold filters.

The invention includes an apparatus for cancelling interference effecting a desired signal, which interference is produced by a source distant from a source of the desired signal. First means provides the desired signal and any undesired signal received with the desired signal and is associated with a null-steering means for separating the desired signal and the undesired signal. The null-steering means cancels at least a portion of the undesired signal. A beamforming means is also associated with the first means for separating the desired signal and the undesired signal and enhancing at least a portion of the desired signal. Second means are provided for coordinating the null-steering means and the beamforming means. The null-steering and beamforming loops employ ON and OFF epoch processors. The null-steering means is operative to reduce the gain of the radiation pattern of an array antenna in the direction of the source of the interference. The beam-forming means is operative to increase the gain of the radiation pattern of the array antenna in the direction of the source of the desired signal.

For a better understanding of the present invention, together with other and further objects, reference is made to the following description, taken in conjunction with the accompanying drawings, and its scope will be pointed out in the appended claims.

DETAILED DESCRIPTION OF THE INVENTION

Figure 1:
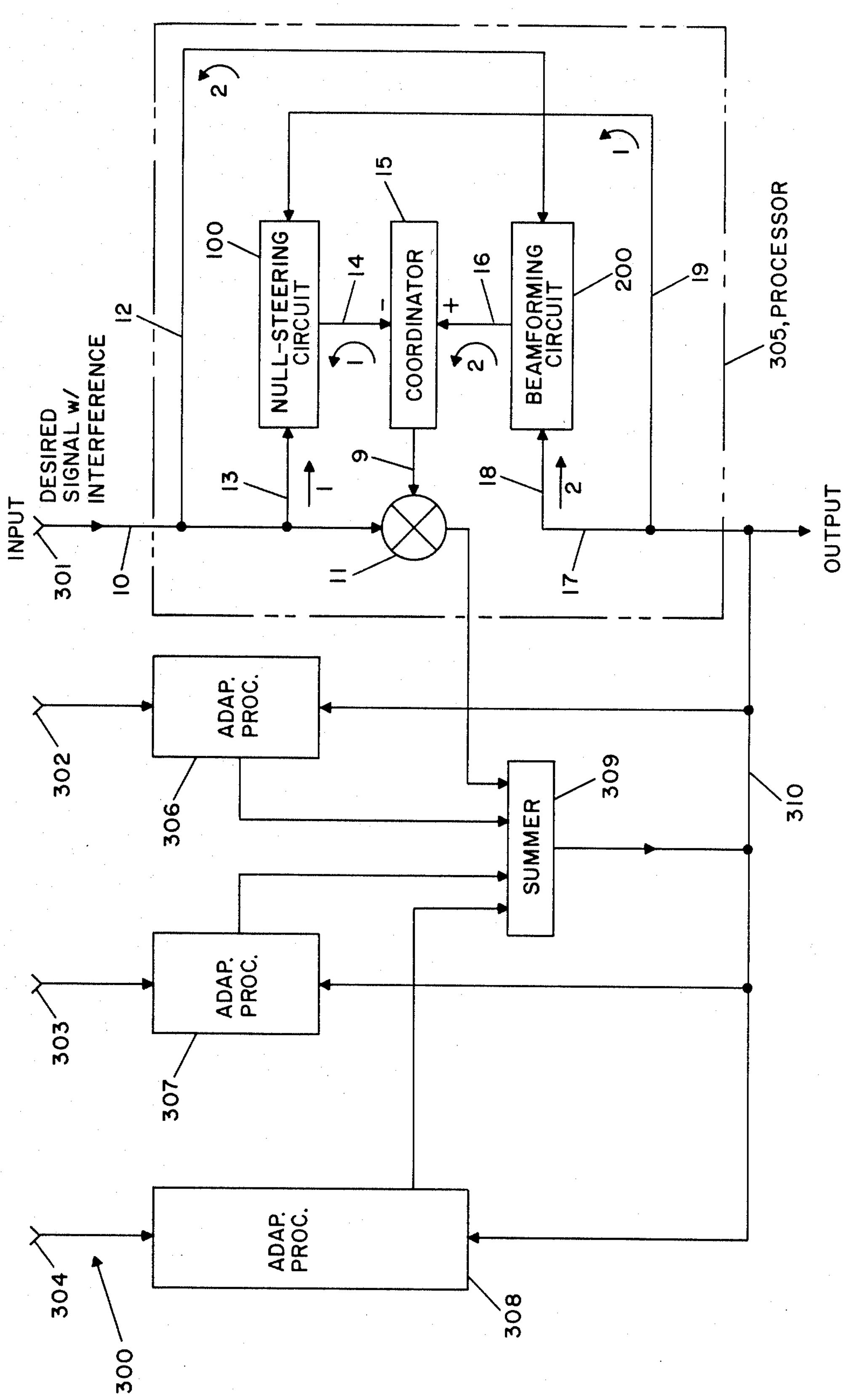
FIG. 1 is a block diagram of an array antenna with adaptive processor according to the invention.
Figure 2:
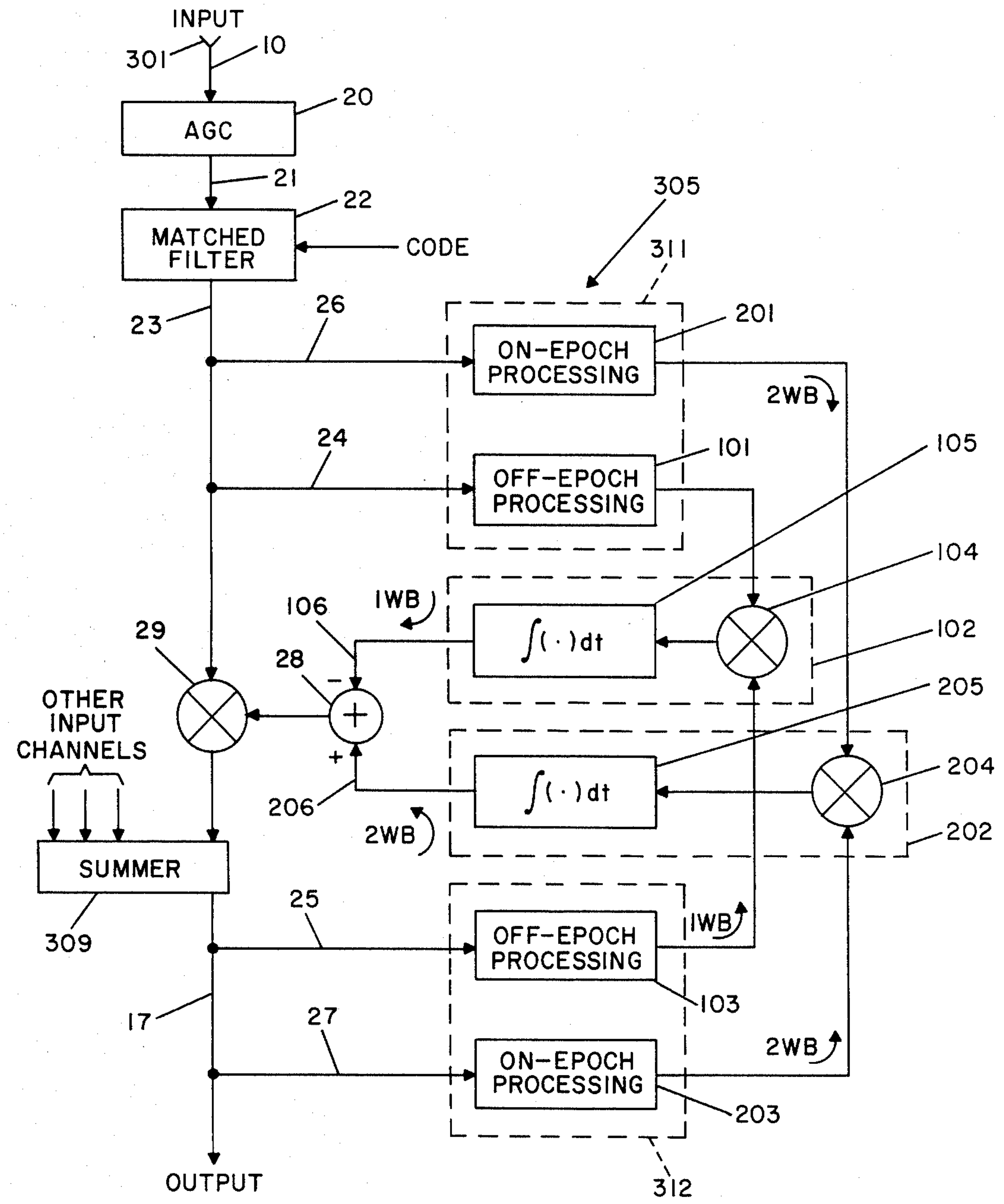
FIG. 2 is a block diagram of a wideband spread spectrum temporal processor for one of a set of signal channels of FIG. 1 according to the invention.
Figure 3:
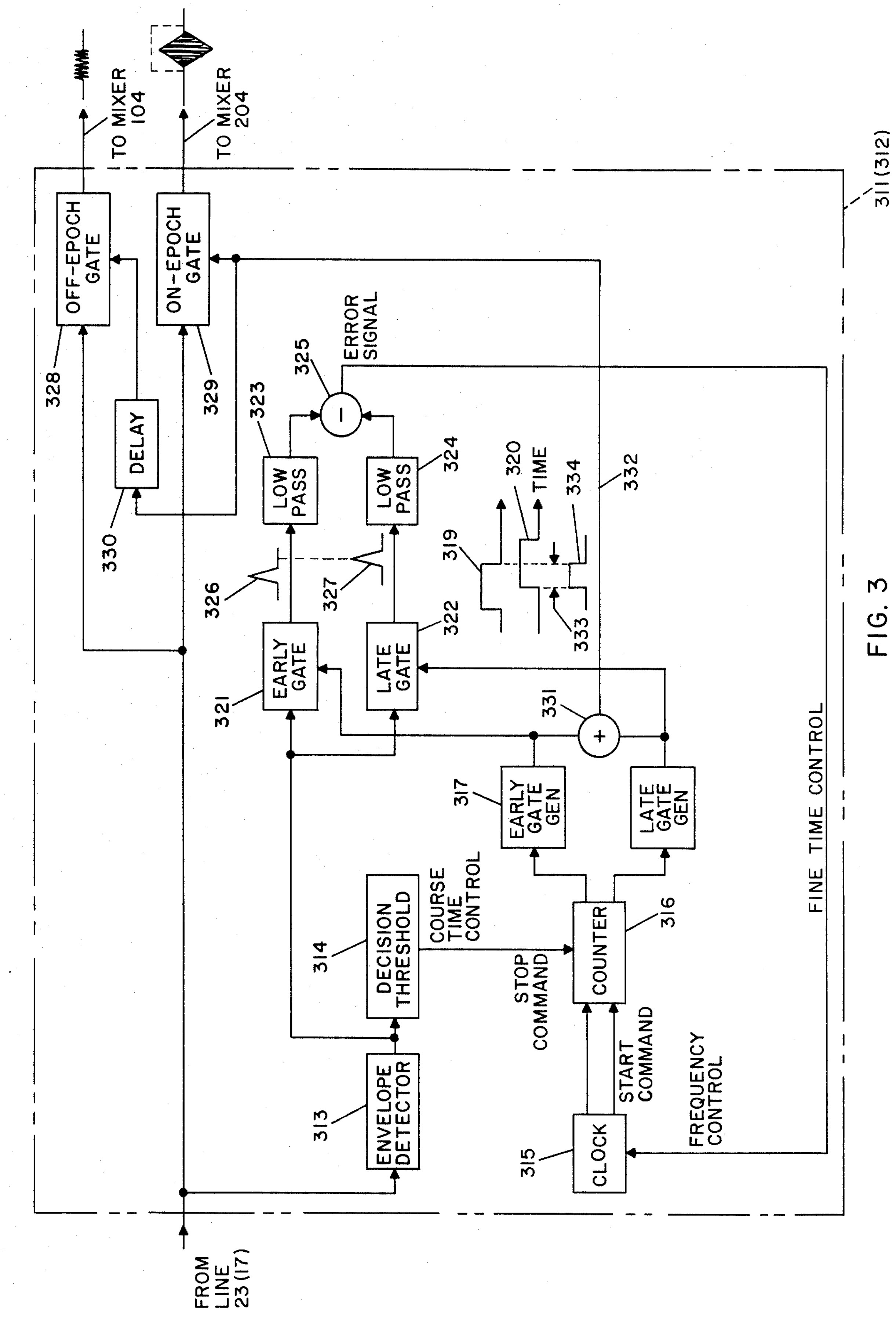
FIG. 3 is a block diagram of an epoch processor of FIG. 2 according to the invention.

FIGS. 1–3 are single line block diagrams used generally to represent a vector system with multiple signals. As used herein, references to a "line" are intended to generally mean multiple paths transmitting more than one signal. Similarly, references to "mixers" generally mean multiplication with vectorial weights for combining multiple signals.

FIG. 1 illustrates in block diagram form the general features of the invention. Practice of the invention is demonstrated with reference to an array antenna 300 having four antenna elements 301, 302, 303, and 304 positioned for receiving an electromagnetic signal. It should be understood that, while the invention will be described with reference to reception of electromagnetic signals, the theory of the invention is applicable equally to the reception of sonic signals in which case the elements of the antenna would be transducers for converting sonic energy to electric energy. The four elements 301–304 of the antenna 300 are presented by way of example, it being understood that many more elements may be employed in practice. Also, in the general case, it is to be understood that the elements 301–304 may be positioned in a straight line or on a curved surface in accordance with the circumstances under which the antenna 300 is to be deployed. The situation in which the elements of the antenna 300 are to be positioned along a curved surface is found in the locating of antenna elements on an aircraft in which case the elements may be positioned on the curved surface of a fuselage or wing of the aircraft.

Adaptive processing of input signals received at the elements 301–304 is accomplished by adaptive signal processors 305, 306, 307, and 308, respectively, coupled to the elements 301–304. Output signals of the processors 305–308 are applied to input terminals of a summer 309 which sums together the output signals of the processors 305–308 to output on line 310 a combined signal of the contributions of all of the elements 301–304 of the antenna 300. The output signal on line 310 is also fed back to each of the processors 305–308 to be used as a reference signal in the generation of weighting factors which are applied by the processors 305–308 in an adaptive fashion to the input signals of the respective elements 301–304 in accordance with the invention as will be described hereinafter.

It is noted that each of the processors 305–308 in combination with its respective antenna element 301–304 constitutes a separate signal processing channel, each channel sharing the summer 309 in common to provide the common reference signal on line 310. Each of these channels operates in the same fashion and comprises the same circuitry. Accordingly, in the ensuing description of the invention, the description will be directed to the circuitry of one of the channels, namely the circuitry within the processor 305, it being understood that this description applies equally well to the other processors 306–308. The overall configuration of a set of processors sharing a common summer for weighting antenna signals is well known and need not be described further for an understanding of the invention. The invention resides within the circuitry of a single processor, such as the processor 305, as will now be described.

As shown in FIG. 1, a desired signal with undesired signals (i.e., interference) is provided by line 10 to mixer 11. The desired signal with interference is also provided via line 12 to beamforming circuit 200 and via line 13 to null-steering circuit 100. The output of null-steering circuit 100 is provided via line 14 to coordinator 15 and added to the output of beamforming circuit 200 provided via line 16. The coordinated sum is provided via line 9 to mixer 11, and further combined with the corresponding signals of the other channels by the summer 309, so that mixed output lines 310 and 17 carry the desired signal with interference mixed with the output of coordinator 15. This mixed signal is provided via line 18 to beamforming circuit 200 and via line 19 to null-steering circuit 100. Effectively, the null-steering circuit 100 functions as a first vector loop 1 to cancel at least a portion of the interfering signals. Conversely, the beamforming circuit 200 functions as a second vector loop 2 to enchance at least a portion of the desired signal so that the mixed signal provided by line 17 has an enhanced S/I ratio and hence message quality.

The null-steering circuit and beamforming circuit may accomplish their functions by temporal processing or by spectral processing. In the processing of phase-coded wideband spread spectrum communication signals, temporal processing may be employed as illustrated in a detailed diagram of the processor 305 in FIG. 2.

As shown in FIG. 2, the desired and interfering signals may be provided via line 10 to an automatic gain control circuit (AGC) 20 for stabilizing the signal amplitude. The output of AGC 20 is applied via line 21 to matched filter 22 and coded with the particular code of the desired signal. The output of matched filter 22 is provided via line 23 to first wideband vector weight control loop 1WB for null-steering and second wideband vector weight control loop 2WB for beamforming. In the first vector loop 1WB, the reference signal provided by line 24 and feedback signal provided by line 25 are processed by off-epoch sample/hold filter circuit 101 and off-epoch sample/hold filter circuit 103, respectively. The processed signals are provided to correlator 102 for weighting the signal of antenna element 301 with the output of correlator 102 provided by line 106 to adder 28. This effectively removes the desired signal from the control signal of a modified LMS algorithm effected in loop 1WB by correlator 102 with the minus sign in the vector loop 1WB shown at adder 28 representing implementation of a minimization process.

In the second vector loop 2WB, the reference signal provided by line 26 and the feedback signal provided by line 27 are processed by on-epoch sample/hold filter circuit 201 and on-epoch sample/hold filter circuit 203, respectively. The processed signals are provided to correlator 202 for weighting with the output of the correlator 102 provided by line 206 to adder 28. The second loop 2WB enhances the desired signal to interference power ratio of the control signal of a modified LMS algorithm effected by correlator 202 with a net positive signal shown at adder 28 representing implementation of a maximization process.

Correlator 102 of vector loop 1WB comprises mixer 104 for mixing the output of the off-epoch circuits 101 and 103 and integrator 105 for integrating the mixed outputs. Correlator 202 of vector loop 2WB comprises mixer 204 for mixing the outputs of on-epoch circuits 201 and 203 and integrator 205 for integrating the mixed outputs. The output (line 106) of correlator 102 of loop 1WB is added to the output (line 206) by correlator 202 of loop 2WB by adder 28 and the sum is mixed by mixer 29 with the input signal provided by line 23 resulting in a mixed output signal provided by line 17.

The epoch processing circuits 101 and 201 are fabricated conveniently as a single unit 311 and, similarly, the epoch processing circuits 103 and 203 are fabricated conveniently as a single unit 312. Both of the units 311 and 312 have the same configuration and, accordingly, only the unit 311 need be described in detail, it being understood that the description thereof applies also to the unit 312. A unit 311 is found in each of the processors 305–308 of FIG. 1. Also, a unit 312 may be placed in each of the processors 305–308 or, alternatively, only one unit 312 need be provided for the entire antenna 300, with the output signals of the single unit 312 being employed by all of the processors 305–308.

With reference to FIG. 3, there is shown a block diagram of epoch processing circuits contained within the unit 311, the description in FIG. 3 applying also to the epoch processing unit 312. Output signals are applied to the mixers 104 and 204 as shown in FIG. 2. The input signal to the epoch processing circuits are obtained from line 23 in the case of the unit 311, and from the line 17 in the case of the unit 312.

The unit 311 comprises an envelope detector 313, a threshold unit 314, a clock 315, a counter 316, and two signal generators 317 and 318 for producing an early-gate signal and a late-gate signal respectively. Input signals from line 23 are detected by the detector 313 which outputs the amplitude of the signal envelope to the threshold unit 314. The counter 316 counts clock pulses applied thereto by the clock 315. The threshold unit 314 outputs a command signal to the counter 316 during the interval of time when a detector 313 outputs a signal amplitude above the threshold of the unit 314. Thereby, the counter 316 is activated and deactivated to count the duration of a pulse of the input signal. The counter 316 strobes the generators 317 and 318. In the case of a repetitive input signal, as is the usual case in radar communication, the strobing of the generator 317 activates the generator 317 to output an early-gate signal, indicated graphically at 319, which extends in time from a point prior to the input signal pulse to the end of the input signal pulse. Similarly, the strobing of the generator 318 activates the generator 318 to output a late-gate signal, indicated graphically at 320, extending in time from a point at the beginning of the input pulse signal to a point after the conclusion of the input pulse signal. The two signals 319 and 320 overlap during the interval of time of the next anticipated occurrence of the input pulse signal.

The units 311 further comprises two gates 321 and 322, two low-pass filters 323 and 324, and a subtractor 325. Both of the gates 321 and 322 have input terminals connected to the detector 313 for receiving signals outputted by the detector 313. The gates 321 is activated by the early-gate signal 319 of the generator 317 to pass detector signals to the filter 323 during the early-gate. The gate 322 is activated by the late-gate signal 320 of the generator 318 to pass detector signals to the filter 324 during the late-gate. The filters 323 and 324 average the signals applied repetitively by the gates 321 and 322. The average values outputted by the filters 323 and 324 are subtracted by the subtractor 325 to produce an error signal which indicates any error in the emplacement of the gate signals 319 and 320 about an input signal pulse. The error signal is applied to the clock 315 to advance or retard the occurrence of clock pulses as commanded by the error signal, thereby to align the overlapping region of the gate signals 319 and 320 with the input signal pulse. Stylized representations of the signals outputted by the early-gate 321 and the late-gate 322 are indicated at 326 and 327.

The unit 311 also comprises two gates 328 and 329, a delay unit 330 and a summer 331. The summer 331 provides an AND function between the early-gate signal 319 and the late-gate signal 320 to output a signal on line 332 having a value of logic-1 during the overlap region of the two signals 319 and 320, and a value of logic-0 otherwise, the overlap region between the two signals 319 and 320 is indicated graphically at 333. The logic-1 signal outputted by the summer 331 is indicated at 334.

The signal 334 indicates the expected time of arrival of the next input signal pulse on line 23, and is applied to a terminal of the gate 329 to activate the gate 329 to conduct a signal from line 23 to the mixer 204. This is termed the on-epoch part of the transmission of signals received by the antenna element 301. The signal 334 is also coupled via the delay 330 to a terminal of the gate 328 to activate the gate to couple signals from the line 23 to the mixer 104. The delay imparted by the delay unit 330 is sufficient to offset the activation interval of the gate 328 to a time after termination of the on-epoch of the gate 329. Accordingly, the interval of activation of the gate 328 is termed an off-epoch portion of the signal received at the antenna element 301.

In operation, the epoch processing circuitry of the unit 311 provides for a tracking of the substantially periodic occurrences of pulses of the input signal outputted by the match filter on line 23. The tracking of the input signal pulse is employed to operate the on-epoch gate 329 and the off-epoch gate 328 to provide samples of the signal energy during the times of receipts of the desired signal, and during the times wherein an interfering signal may be received. The off-epoch interval provides jamming data utilized by the loop 1WB (FIG. 2) for directing a null in the direction of an interfering signal. The on-epoch interval provides energy of the desired signal which is employed by the loop 2WB (FIG. 2) for maximizing the gain of the antenna 300 in the direction of a source of the desired signal. It is also noted that in the operation of the processor 305, that the integration operation of the correlators 102 and 202 converts the pulsed signal outputted by the epoch gates 328 and 329 to continuous signals applied to the adder 28 for formation of a continuously present weighting factor applied to the mixer 29. Thereby, the epoch processing circuits in conjunction with the correlators provide the adaptive control, loops with the characteristic of a sample-hold filter circuit with the temporal filtering being accomplished by the late and early-gate tracking operation.

Figure 4:
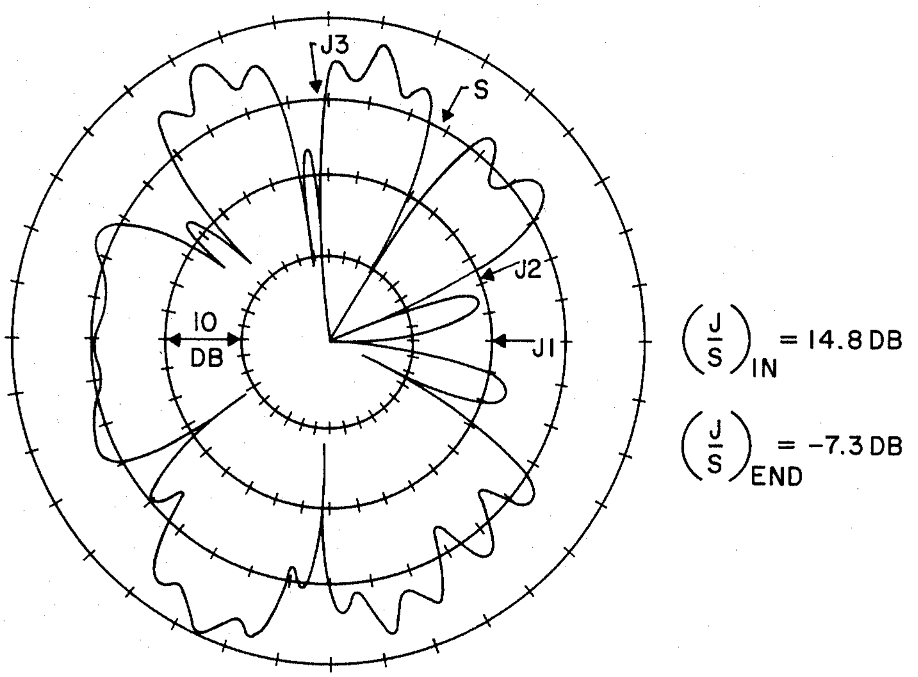
FIG. 4 is an array antenna pattern in the horizontal plane illustrating null-steering simulation.
Figure 5:
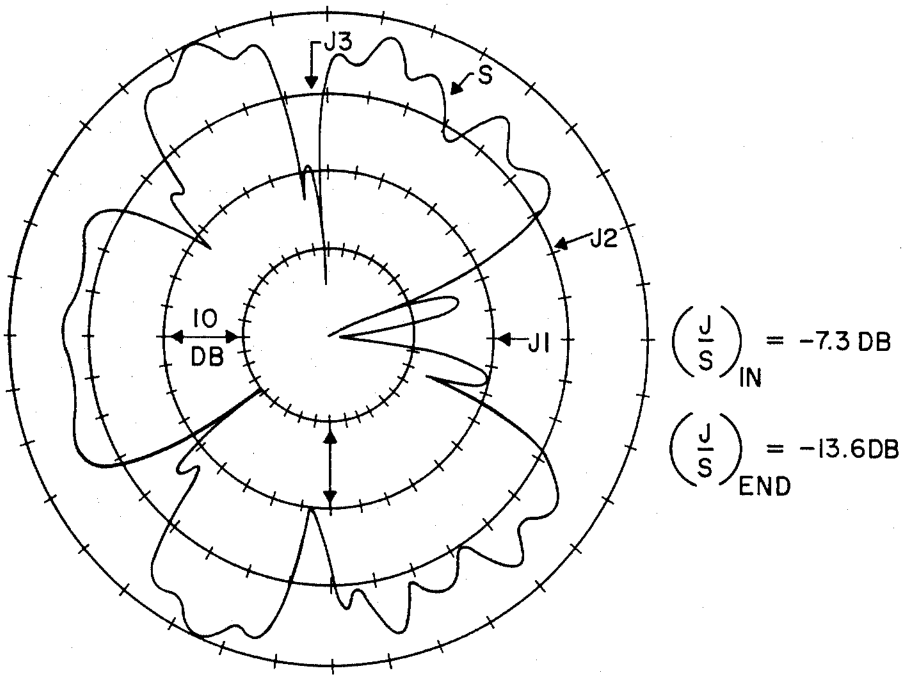
FIG. 5 is an array antenna pattern in the horizontal plane illustrating beamforming/null-steering simulation according to the invention.

FIGS. 4 and 5 illustrate the benefits of simultaneous null-steering and beamforming for a five-element random spaced array of antennas with an extent of 1×6 wavelengths in the azimuth plane and 2 wavelengths in elevation in a scenario consisting of three equal strength jammers (J1, J2, J3) which are 10 dB above the desired signal at each antenna:

| | Elevation | Azimuth |
|---|---|---|
| Jammer 1 (J1) | 0° | 0.4° |
| Jammer 2 (J2) | 0° | 22.3° |
| Jammer 3 (J3) | 0° | 93.8° |
| User (5) | 0° | 62.2° |

FIG. 4 is the adapted antenna pattern attained from a null-steering only control on the full signal band of frequencies for a loop bias condition which results in a single element "on" quiescent weight vector. In the adapted state, all the jammers are nulled by about 30 dB and the desired signal(s) falls on the sides of a null which leads to a net improvement in S/J (signal to jammer) ratio of about 22 dB. FIG. 5 is the adapted pattern for the same scenario when the adaptive processor is configured according to the invention employing both null-steering and beamforming. In this adapted state, the null in the vicinity of the desired signal(s) is filled in leading to an additional 6 dB improvement in S/J ratio.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An apparatus for cancelling undesired signals received with a desired spread spectrum signal, said apparatus comprising:

first means for providing the desired and any undesired signals received with the desired signal;

null-steering means, including a first temporal processing means associated with said first means, for temporally separating the desired and any undesired signals and cancelling at least a portion of any undesired signals;

beamforming means, including a second temporal processing means associated with said first means, for temporally separating the desired and any undesired signals and enhancing at least a portion of the desired signal; and second means for coordinating said null-steering means and said beamforming means;

wherein said first temporal processing means comprises a first adaptive control loop coupled to said first means, said first loop having a negative correcting output for minimizing the undesired signal;

said second temporal processing means comprises a second adaptive control loop coupled to said first means, said second loop having a positive correcting output for maximizing the desired signal; and said second means comprises means for summing the negative correcting output and the positive correcting output, and a mixer for mixing the desired and any undesired signals with the sum to provide a mixed output;

further wherein said first adaptive control loop comprises a first off-epoch sample-and-hold filter circuit coupled to the first means and providing an off-epoch unmixed output, a second off-epoch sample-and-hold filter circuit coupled to the mixed output and providing an off-epoch mixed output, and a correlator for correlating the off-epoch unmixed output with the off-epoch mixed output to provide said negative correcting output;

and finally wherein each of said epoch filter circuits includes means for tracking a desired signal, said tracking means including an early-gate and a late-gate overlapping a time of occurrence of the desired signal, there being an off-epoch gate and an on-epoch gate driven by said tracking means, for extracting samples of the desired signal and any interfering signal.

2. The apparatus of claim 1 wherein said second adaptive control loop comprises a first on-epoch sample-and-hold filter circuit coupled to the first means and providing an on-epoch unmixed output, a second on-epoch sample-and-hold filter circuit coupled to the mixed output and providing an on-epoch mixed output, and a correlator for correlating the on-epoch unmixed output with the on-epoch mixed output to provide said positive correcting output; and wherein each of said on-epoch filter circuits includes means for tracking a desired signal, said tracking means including an early-gate and a late-gate overlapping a time of occurrence of the desired signal, there being an off-epoch gate and an on-epoch gate driven by said tracking means, for extracting samples of the desired signal and any interfering signal.

* * * * *